US006732183B1

(12) United States Patent  
Graham (10) Patent No.: US 6,732,183 B1  
(45) Date of Patent: May 4, 2004

(54) VIDEO AND AUDIO STREAMING FOR MULTIPLE USERS

(75) Inventor: John J. Graham, Saratoga, CA (US)

(73) Assignee: BroadWare Technologies, Inc., Cupertino, CA (US)

( * ) Notice: Subject to any disclaimer, the term of this patent is extended or adjusted under 35 U.S.C. 154(b) by 0 days.

(21) Appl. No.: 09/565,563

(22) Filed: May 4, 2000

Related U.S. Application Data (63) Continuation-in-part of application No. 09/001,850, filed on Dec. 31, 1997.
(60) Provisional application No. 60/034,128, filed on Dec. 31, 1996.

(51) Int. Cl.[7] .............................................. G06F 15/16
(52) U.S. Cl. ...................................... 709/231; 348/722
(58) Field of Search ................................. 709/245, 203, 709/231; 370/401, 352, 395, 229; 348/722; 345/327

(56) References Cited

U.S. PATENT DOCUMENTS

| 5,228,859 | A |   | 7/1993  | Rowe           |         |
|-----------|---|---|---------|----------------|---------|
| 5,247,670 | A |   | 9/1993  | Matsunaga      |         |
| 5,390,240 | A |   | 2/1995  | Sensney        |         |
| 5,512,938 | A |   | 4/1996  | Ohno           |         |
| 5,528,282 | A |   | 6/1996  | Voeten et al.  |         |
| 5,602,992 | A |   | 2/1997  | Daneels        |         |
| 5,606,693 | A |   | 2/1997  | Nilsen et al.  |         |
| 5,668,986 | A |   | 9/1997  | Nilsen et al.  |         |
| 5,668,996 | A |   | 9/1997  | Radinsky       |         |
| 5,724,355 | A | * | 3/1998  | Bruno et al.   | 370/401 |
| 5,751,280 | A |   | 5/1998  | Abbott et al.  |         |
| 5,764,750 | A | * | 6/1998  | Chau et al.    | 379/229 |
| 5,764,916 | A |   | 6/1998  | Busey et al.   |         |
| 5,778,181 | A |   | 7/1998  | Hidary et al.  |         |
| 5,802,526 | A |   | 9/1998  | Fawcett et al. |         |
| 5,815,662 | A |   | 9/1998  | Ong            |         |
| 5,828,839 | A |   | 10/1998 | Moncreiff      |         |
| 5,842,015 | A |   | 11/1998 | Cunniff et al. |         |
| 5,844,553 | A |   | 12/1998 | Hao et al.     |         |
| 5,861,881 | A | * | 1/1999  | Freeman et al. | 345/302 |
| 5,864,555 | A | * | 1/1999  | Mathur et al.  | 370/395 |
| 5,880,792 | A | * | 3/1999  | Ward et al.    | 348/722 |
| 5,884,032 | A |   | 3/1999  | Bateman et al. |         |
| 5,889,506 | A |   | 3/1999  | Lopresti et al.|         |
| 5,889,942 | A |   | 3/1999  | Orenshteyn     |         |
| 5,898,780 | A |   | 4/1999  | Liu et al.     |         |
| 5,905,524 | A |   | 5/1999  | Sauer          |         |
| 5,905,872 | A | * | 5/1999  | DeSimone et al.| 709/245 |
| 5,922,054 | A |   | 7/1999  | Bibayan        |         |
| 5,928,327 | A |   | 7/1999  | Wang et al.    |         |
| 5,928,330 | A |   | 7/1999  | Goetz et al.   |         |

(List continued on next page.)

OTHER PUBLICATIONS

Paek et al, Video Server Retrieval Scheduling for Variable Bit Rate Scalable Video, IEEE 1996.*

(List continued on next page.)

*Primary Examiner*—Marc D. Thompson  
*Assistant Examiner*—Thong Vu  
(74) *Attorney, Agent, or Firm*—Cooley & Godward LLP (57) ABSTRACT

A computer system provides streaming media to a plurality of clients over a network. The system includes a proxy module that forwards streaming media from a first streaming media source to a network server module that is communicating to the plurality of client terminals. The proxy module is comunicatable with the network server module to be signaled a switch request. In response to the switch request, the proxy module forwards streaming media from a second streaming media source to the network server module while the network server module is signaling streaming media from the first streaming media source to the plurality of client terminals.

7 Claims, 7 Drawing Sheets

U.S. PATENT DOCUMENTS

| | | | |
|---|---|---|---|
| 5,930,493 | A | 7/1999 | Ottesen et al. |
| 5,953,005 | A | 9/1999 | Liu |
| 5,956,716 | A | 9/1999 | Kenner et al. |
| 5,960,173 | A | 9/1999 | Tang et al. |
| 6,006,241 | A | 12/1999 | Purnaveja et al. |
| 6,009,410 | A | 12/1999 | LeMole et al. |
| 6,018,768 | A | 1/2000 | Ullman et al. |
| 6,020,931 | A * | 2/2000 | Bilbrey et al. ............... 348/584 |
| 6,025,837 | A | 2/2000 | Matthews, III et al. |
| 6,055,522 | A | 4/2000 | Krishna et al. |
| 6,091,407 | A * | 7/2000 | Boetje et al. ............... 345/327 |
| 6,151,609 | A | 11/2000 | Truong |
| 6,222,843 | B1 * | 4/2001 | Mauger ...................... 370/397 |
| 6,298,120 | B1 | 10/2001 | Civinlar et al. |
| 6,452,933 | B1 | 9/2002 | Duffield et al. |

OTHER PUBLICATIONS

Huang et al, The Mercuri Multimedia Laboratory at Honeywell, IEEE 1996.*

Liu et al, Perfomance of a Storage System for Supporting Different Video Types and Qualities, IEEE 1996.*

Server Products User's Guide, Graham Technology Solutions, Inc. www.graham.com/products/manual. 1998.*

Paek et al. "Video Server Retrieval Scheduling for Variable Bit Rate Scalable Video", IEEE 1996, ps. 108–112.

Huang et al., "The Mercuri Multimedia Laboratory at Honeywell", IEEE 1996, pp. 72–77.

Liu et al., Performance of a Storage System for Supporting Different Video Types and Qualities, IEEE 1996, pp. 1314–1331.

Instructions for using Netscape Navigator, downloaded from Netscape website/.../NetHelp/netscape/navigator/nav.html, printed on Dec. 14, 1997, 67 pages.

Video Server Architectures: Performance and Scalability.. – Bernhardt, et al. (1994) ffp.eurecom.fr/ATM/papersEURECOM/PAPERS/brestBernhardt.ps.g2.

* cited by examiner

VIDEO AND AUDIO STREAMING FOR MULTIPLE USERS

CROSS REFERENCE TO RELATED APPLICATIONS

This continuation-in-part appliction claims priority from the U.S. patent application Ser. No. 09/001,850, filed Dec. 31, 1997, entitled Video And Audio Streaming For Multiple Users, which claims priority to U.S. Provisional Patent Application No. 60/034,128, filed Dec. 31, 1996, both of the aforementioned applications are herein incorporated by reference.

BACKGROUND OF THE INVENTION

1. Field of the Invention

This invention relates to the field of network delivery of audio and video information. In particular, the invention relates to a system for delivering audio and video information to multiple users.

2. Background Information

The Internet enables many different ways of communicating. Originally, the Internet was used for the exchange of files and electronic mail. As the capabilities of the Internet expand, other types of communications are enabled.

Audio and video transmissions are an important area of the communications that the Internet enables. For example, many technologies support the transmission of digital video and/or audio signals over the Internet. An example of such a technology is Quicktime™, available from Apple Computer, Inc., of Cupertino Calif. Quicktime movies are files that can be transmitted across the Internet. Quicktime provides both audio and video displays. Many other file formats allow audio and video to be displayed on people's computers.

This paragraph describes an example use of a the Quicktime technology. A user will have a browser application that resides on his/her computer. The computer, acting as a client under the direction of the browser application, will connect to various World Wide Web (web) servers. Each web server will typically serve hypertext markup language (HTML) files to the clients. The files may include text, graphics references, and references to specialized files. Some of these specialized files can include audio and video information in Quicktime form. The clients can then play these audio and video files once they are downloaded using a Quicktime plug-in, a helper application, or Quicktime capabilities built into the browser application. A plug-in and a helper application are described in greater detail below.

Streaming audio and video, as a subset of all the types of audio and video that can be transmitted over the Internet, allow people to broadcast long and/or live video and audio transmissions across the Internet. Streaming video and audio is video and audio digital data that is transmitted on a continuous basis. A client can access the data stream and regenerate the video images and audio signal as they are being transmitted. Streaming technology is particularly helpful where the events are live, or where the files would be so large as to be a burden on the end users. Examples of where streaming technology is particularly useful are for the display of conferences, sporting events, radio broadcasts, television broadcasts, and the like.

RealNetworks, Inc. of Seattle, Wash., provides a system for transmitting streaming audio and video signals to users over the Internet. RealNetworks supplies a server that allows multiple users to simultaneously receive streaming audio and video.

The real audio system requires that not only the client have additional software, but that the content provider have a separate server from their normal web server. For a client to receive a real audio broadcast, the client typically connects through their browser to a Web page with a reference to a real audio server. The client then accesses its separate real audio player program. The real audio player program then connects to the referenced real audio server. A significant drawback to such an arrangement is that the user must download the real audio player program. This program must then be installed on the user's computer. This may cause a number of problems for the user. For example, if the user is behind a firewall, or some security program, the client may not be able to receive the broadcast from the server. Additionally, the installation of any program may have conflicts with other programs. The program has the disadvantage of being platform specific. This means that a different program must be developed and downloaded for each type of computer that is to be used to access RealNetworks broadcasts. Additionally, the broadcasters of the streaming audio and video need to use the RealNetworks server, which is separate from the broadcasters' World Wide Web server (also referred to as the web server). This increases the broadcasters' security problems because now the broadcasters must be concerned with two separate servers.

Another example of a video and audio system that uses Internet like communications is the MBone. The MBone is a specialized communication network that allows for the distribution of streaming video and audio signals to multiple users. A specialized network is set up specifically to transmit MBone communications. A significant drawback of this system is that users must be connected to the specialized network. Additionally, users will be required to have specialized software on their computers to listen to and watch MBone transmissions.

A streaming video system, not requiring a user to download a separate program, was developed for a single user by John Graham of California. This single user broadcast technology allowed a web server to serve a single streaming video signal to a single client. Although the user did not need to download a plug-in to see the video, only one user was allowed to access the video stream at a time. In this system, video information was captured from a video camera and digitized. The digital video information was then encapsulated in a MIME encoded multipart data stream. The client received this data stream and reconstructed frames of the digital video.

Therefore, what is desired is a platform independent video and audio streaming system that does not require the user to download additional programs beyond the functionalities found in a browser.

1. A SUMMARY OF THE INVENTION

A system and method of providing streaming audio and video data to multiple users is described. In one embodiment, the system comprises a first client, a second client and a server. The first and second clients are executing browsers. The server can communicate with the two clients. The server concurrently provides streaming audio and video data to both of the clients. Importantly, the server does not require the two browsers to use a plug-in or a helper application to receive and use the streaming audio and video data.

In some embodiments of the invention, a browser causes a client to request an HTML file from a web server. The client receives the HTML file. The HTML file includes an HTML tag that directs the browser to load one or more applets from the server. The browser executes the applets causing the browser to request streaming audio and video from the web server. That request may or may not include parameters giving information about the type of request being made. The web server associates a server process with the request, given the parameters in the request. The web server notifies real-time audio and video process that streaming audio and video information is needed. In response to the notification, the real-time audio and video process stores encoded audio and video data in a shared memory location. The server process accesses the shared memory and inserts the audio and video data into one or more data streams. The client receives the data streams and reconstructs the audio and video signals using only the capabilities of the browser. In some embodiments, a separate stream and server process is used for each of the audio and video data. These embodiments allow multiple clients to simultaneously receive the same audio and video data.

Other embodiments of the invention include a web server that can serve streaming audio and video information as well as perform more usual web server functions (such as, serving web pages, performing file transfers, supporting secure communications). These embodiments have the advantage of allowing the broadcasters and the users to set up their security configurations for one web server, rather than two servers (a web server and a streaming audio and video server).

Although many details have been included in the description and the figures, the invention is defined by the scope of the claims. Only limitations found in those claims apply to the invention.

2. A BRIEF DESCRIPTION OF THE DRAWINGS

The figures illustrate the invention by way of example, and not limitation. Like references indicate similar elements.

3. THE DESCRIPTION

The following sections describe embodiments of the invention. The first section provides definitions that will help in the understanding of the remaining sections. The second section shows an example system that supports various embodiments of the invention. The third section describes an example method of using the invention. The fourth section illustrates an actual use of the streaming audio and video used in some embodiments of the invention. The last section reviews additional alternative embodiments of the invention.

(a) Definitions

The following definitions will help in the understanding of the following description.

Client: a computer, process, program, or combination of computers, processes or programs, that can communicate with a server.

Server: a computer, process, program, or combination of computers, processes or programs, that can communicate with a client. The server and the client can be executing on the same computer(s).

Web server: a server for serving at least Internet related requests. Example web servers can serve HTML pages in response to HTTP requests from clients. Some web servers can serve many different kinds of requests, e.g., HTTPS, and/or FTP.

Browser: an application, program, process, or combination of applications, programs or processes, that allow a client to make a request of a web server and process the results of the request. The browser may be part of a stand alone application or a set of programs that are integrated into the operating system of the client.

Plug-in: plug-ins are external software programs that extend the capabilities of the browser in a specific way. For example, a plug-in can be used to give the browser the ability to play audio samples or view video movies from within the browser.

Helper application: like plug-ins, helper applications are external software programs. The browser redirects some types of file to the helper applications. The helper applications allow clients to process many different types of files on the Internet. When the browser encounters a sound, image, or video file, the browser hands off the data to the helper applications to run or display the file.

JavaScript: a stand-alone programming language built into many browsers. Primarily an extension to the Internet standard HTML language.

Java: a programming language whose programs (called applets) can travel over the Internet for use by clients. Whereas plug-ins and helper applications are tailored for a particular type of client, Java applets generally work across the Internet regardless of the type of client. Many browsers include Java capabilities so Java applets require no installation. Except where noted, Java and JavaScript are interchangeable.

(b) System

Figure 1:
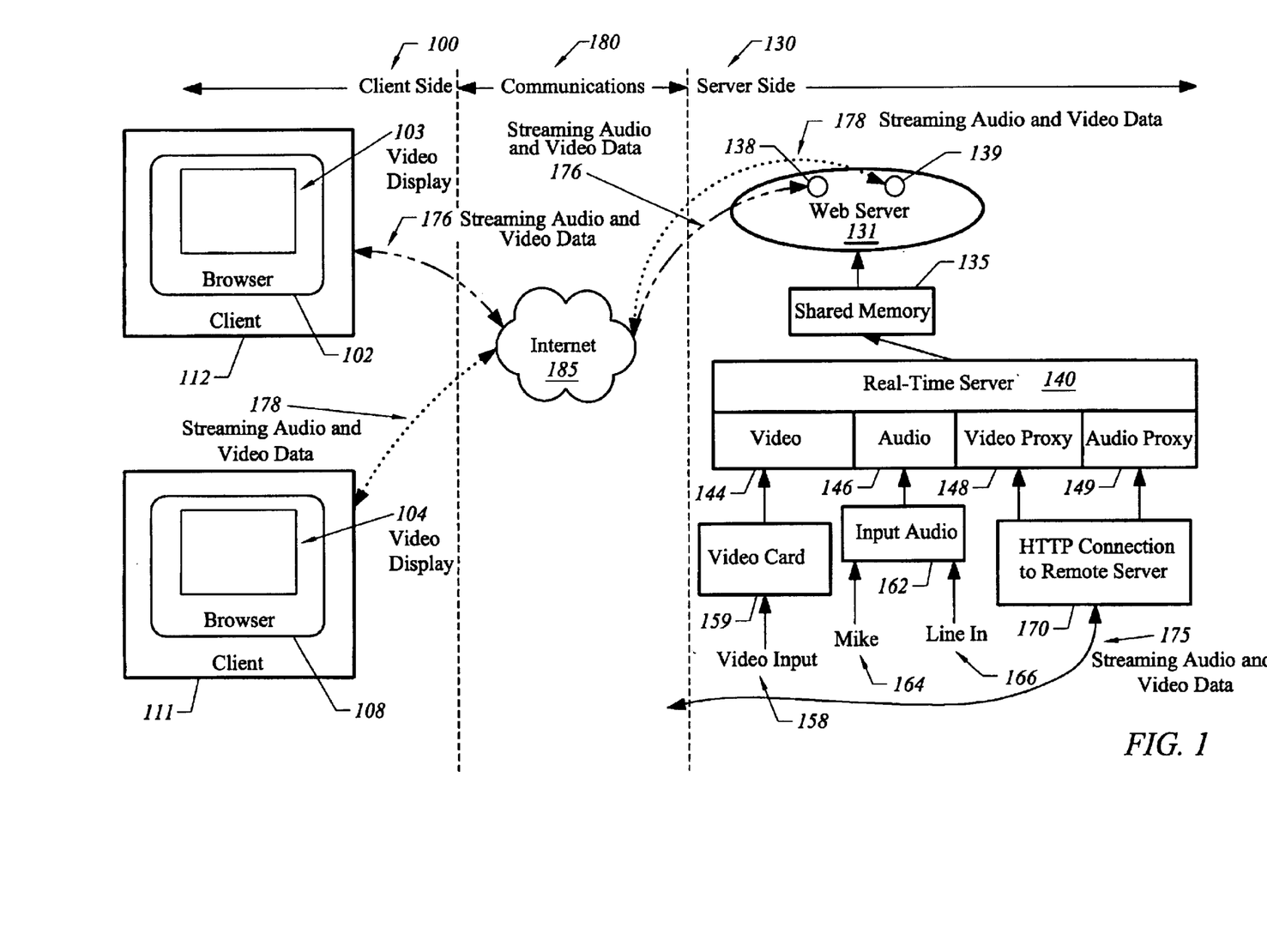
FIG. 1 illustrates a system including one embodiment of a streaming audio and video system for multiple users where client computers do not need plug-ins or helper programs.

FIG. 1 illustrates a system including one embodiment of the invention where audio and video is supplied over the Internet to multiple users. The following paragraphs first list the elements of FIG. 1, describe their interconnections, and then describe the various elements in greater detail.

This paragraph lists the elements of FIG. 1. FIG. 1 includes a system having three parts: a client side 100, a communications interface 180, and a server side 130. The client side 100 includes a client 112 and a client 111. The client 112 includes a browser 102 having a video display area 103. The client 111 includes a browser 108 and a video display area 104. The communications interface 180 includes the Internet 185. The server side 130 includes a web server 131, a shared memory 135, and a real-time server 140. The web server 131 includes two processes, a process 138 and a process 139. The real-time server 140 includes a video module 144, an audio module 146, a video proxy 148, and an audio proxy 149. The real-time server 140 interfaces with a number of other elements. These elements include a video card 159, an input audio interface 162, and an HTTP connection to remote server 170. Various elements of FIG. 1 have now been listed.

The following paragraphs describe the interconnections between the elements of FIG. 1. Beginning on the server side 130, the video card 159 receives a video input 158 outputs a digital video signal to the video module 144. Similarly, an input audio interface 162 receives a mike input 164 and/or a line input 166 and outputs a digital audio signal to the audio module 146. The HTTP connection to remote server 170 receives a streaming audio and video data 175. The HTTP connection to remote server 170 outputs the video data to the video proxy module 148 and the audio data to the audio proxy module 149. The real-time server 140 uses the data received by the various modules and stores portions of that data in the shared memory 135, after some manipulation of the data. The shared memory 135 is accessed by the web server 131. The process 138 and the process 139 transmit and receive data to the communications interface 180. Thus, the couplings of the server side 130 have been described. In some embodiments, the process 138 and the process 139 correspond to HTTPD processes.

The communications interface 180 allows the client side 100 to communicate with the server side 130. The communications interface, and the Internet 185 in particular, support many different types of connections by the client side 100 and the server side 130. In the example communications interface 180, the communications interface 180 includes the Internet 185. In particular, in this example, the process 138 is communicating streaming audio and video data 176 to the Internet 185. Similarly, the process 139 is communicating the streaming audio and video data 178 to the Internet 185.

On the client side 100, the client 112 is communicating the streaming audio and video data 176 with the Internet 185. Similarly, the client 111 is communicating with the Internet 185 to receive and manage the streaming audio and video data 178. The clients then communicate the information to their respective browser applications. The browser applications the generate video images in their respective video display areas.

Thus, the connections between the various elements of FIG. 1 have been described. Now the various elements will be described in greater detail in the following paragraphs. An example method of using these elements is described below in relation to FIG. 2.

The server side 130 will be described first.

The video input 158 represents a video signal that a user of such a system wishes to broadcast to the clients on the client side 100. The video input 158 can include analog signals representing video information. The video card 159 digitizes the video input 158 to produce a digital video image. Various embodiments of the invention include Sun video cards available from Sun Microsystems, of Mountain View, Calif., and Parallax XVideo Xtra™ video cards, available from Parallax Graphics, Inc., of Santa Clara, Calif. However, what is important is that the real-time server 140, and in particular the video module 144, receives some sort of digitized video signal. The video module 144 is responsible for providing the real-time server 140 with the video information that will be broadcast to the client side 100. The video module 144 can convert the digitized video signals to be of better use to the rest of the system. For example, the video module 144 may, if not done by the video card 159, convert digital video data into a sequence of JPEG digital video frames. In any case, what is important is that the real-time server 140 receives digital video information in a format that it can use (example formats include, JPEG, MPEG, GIF, and AVI).

Similarly, the input audio interface 162 allows for the input of analog audio signals and converts this input to digital audio signals. What is important is that the audio module 146 receives a digitized audio signal that can be used by the real-time server 140. The audio module 146 may convert the digitized audio signal into any of a number of formats, corresponding to any of a number of audio transmission rates (examples include G.711 and G.723 audio compression formats).

The HTTP connection to remote server 170 represents an important advantage of one embodiment of the invention. In this embodiment, the HTTP connection to remote server 170 allows the server side 130 to forward broadcasts of audio and video signals from other streaming audio and video servers. In these uses, the server side 130 acts as a client to another server. The HTTP connection to remote server 170 can receive video and audio signals being broadcast through the Internet 185 from another server. The HTTP connection to remote server 170 provides the digital video information from the other server to the video proxy module 148. Similarly, the HTTP connection to remote server 170 provides the audio data to the audio proxy module 149. The video proxy module 148 and the audio proxy module 149 then supply the respective video and audio data to the real-time server 140.

The real-time server 140 represents an application, or set of applications, executing on one or more computers, that prepares audio and video data for broadcasting to multiple users through the web server 131. The real-time server 140 takes the data from the various modules, processes the data, and stores the processed data in the shared memory 135. The real-time server 140 can perform compression, and other manipulations of the data, to reduce the processing burden on the web server 131. For example, in some embodiments of the invention, the real-time server 140 receives digitized video data and compresses that data into JPEG images. These JPEG images are sequenced digital frames of video. Similarly, for the audio data, the real-time server 140 breaks the audio information into one-half second time periods of audio data (other embodiments use other time periods). These one-half second time periods of data are stored in the shared memory 135. The real-time server 140 can also compress the audio information into one of a number of various compressed audio signals (e.g., G.711 and/or G.723 audio compression formats). In some embodiments of the invention, the real-time server can broadcast audio and video from multiple sources to multiple clients.

The shared memory 135 represents a shared storage area for use by the real-time server to store audio and video data for access by the web server 131. In one embodiment the shared memory 135 has a locking and semaphore usage scheme to ensure that the real-time server 140 is not writing data into the shared memory 135 while the web server 131 is accessing that data. In some embodiments, the semaphores act as notifiers to indicate that new data in the shared memory 135 is available for use by the web server 131. In some embodiments, the video data and the audio data are stored in different shared memory locations.

The web server 131 communicates data over the Internet 185 using one or more communications protocols. In some embodiments of the invention, these protocols include HTTP (Hypertext Transfer Protocol), TCP (Transmission Control Protocol) and UDP (User Datagram Protocol). The web server 131 represents an application, including one or more processes, for communicating over the Internet 185. In one embodiment, the web server 131 includes an Apache web server. Each of the processes in the web server 131 represents one or more processes for serving streaming audio and video data to the client side 100. In some embodiments, the web server 131 transmits the video data as a multipart MIME (multi-purpose Internet mail extensions) encoded file for decoding directly by the browser or as compressed video information for decoding by an applet run in the browser. The web server 131 transmits the audio data as compressed audio data for decoding by an applet run in the browser.

In some embodiments, the web server 131 initiates a separate process for each audio and video connection made from client side 100. Thus, for one client receiving streaming audio and video data, two processes would be started within the web server 131. The first process would supply video data and the second process would supply audio data. The processes access the shared memory 135 and serve the data across the Internet to the respective client.

In some embodiments, the web server 131 initiates at least one process for each client. This provides important advantages in some embodiments of the invention. In particular, because the web server 131 is serving the data directly through processes it created, server side 130 users need not worry about security issues beyond those already faced with their web server 131. Thus, these embodiments of the invention have a lower chance of interfering with client side 100 fire walls and have a lower chance of having a server side 130 security problem.

Other embodiments of the invention include separate Common Gateway Interface (CGI) programs for audio and video. These CGI programs are used by the web server 131 to serve the streaming audio and video data. These CGI programs are not necessarily integrated as tightly to the web server 131 as the process 138 and the process 139. However, a CGI program allows for the easy extension of many different types of web servers.

The communications interface 180 permits communications between the server side 130 and the client side 100. In this example, the Internet 185 supports the communications. Other embodiments of the invention support other communications interfaces. For example, the Internet 185 can be replaced by a local area network, a wide are network, a proprietary telecommunications and networking infrastructure, or some other communications interface. What is important is that the server side 130 can communicate with the client side 100. The communications interface 180 can also include combinations of the above described technologies. For example, the Internet 185 can include a web server to which the clients on the client side communicate through to access the Internet 185. The client side 100 can be on a local area network that is connected through a server, or router, to the Internet 185.

The client side 100 represents the consumers of the streaming audio and video data. In this example, the two clients are receiving separated streaming audio and video data signals. Other embodiments of the invention support many more clients.

The client 112 represents a computer, such as a PC compatible computer, running a browser application 102. For video display, the browser application 102 can include a Netscape Navigator™ or Communicator™ program for "multipart/xmixed-replace MIME type video," or a Microsoft Internet Explorer™ 3.0 or later for a Java based video transmission. In some embodiments, the Java based video transmission applet parses the multipart/x-mixed-replace MIME type video. For audio, the browser application 102 can include any browser that supports Java and/or JavaScript.

The browser application 102 is responsible for receiving the streaming audio and video data 176 and reconstructing an audio and video signal suitable for the end user. In this example, the video display area 103 displays the reconstructed video information received from the video input 158 at the real-time server 140. Similarly, the client 111 is executing the browser 108. The browser 108 is displaying the same video signal in the video display area 104. The client 111 represents another computer executing a browser application.

Various embodiments of the invention have modifications to the system shown in FIG. 1. Some of these variations are described in this paragraph. For example, the client 111 and the client 112 can be the same computer or be different computers. The clients can be on the same local area network or be on completely different local area networks. There can be many more clients receiving the information from the client side 100. Additionally, as shown with the HTTP connection to remote server 170, a real-time server 140 can appear on the client side 100 to distribute data to other clients.

Note that portions of the system, and embodiments of the invention, are sets of computer programs or computer that can be stored on computer usable media such as floppy disks, hard drives, CD ROMs, Zip disks, etc.

Thus, an example system supporting streaming audio and video data for multiple users has been described.

(c) Example Method

Figure 2:
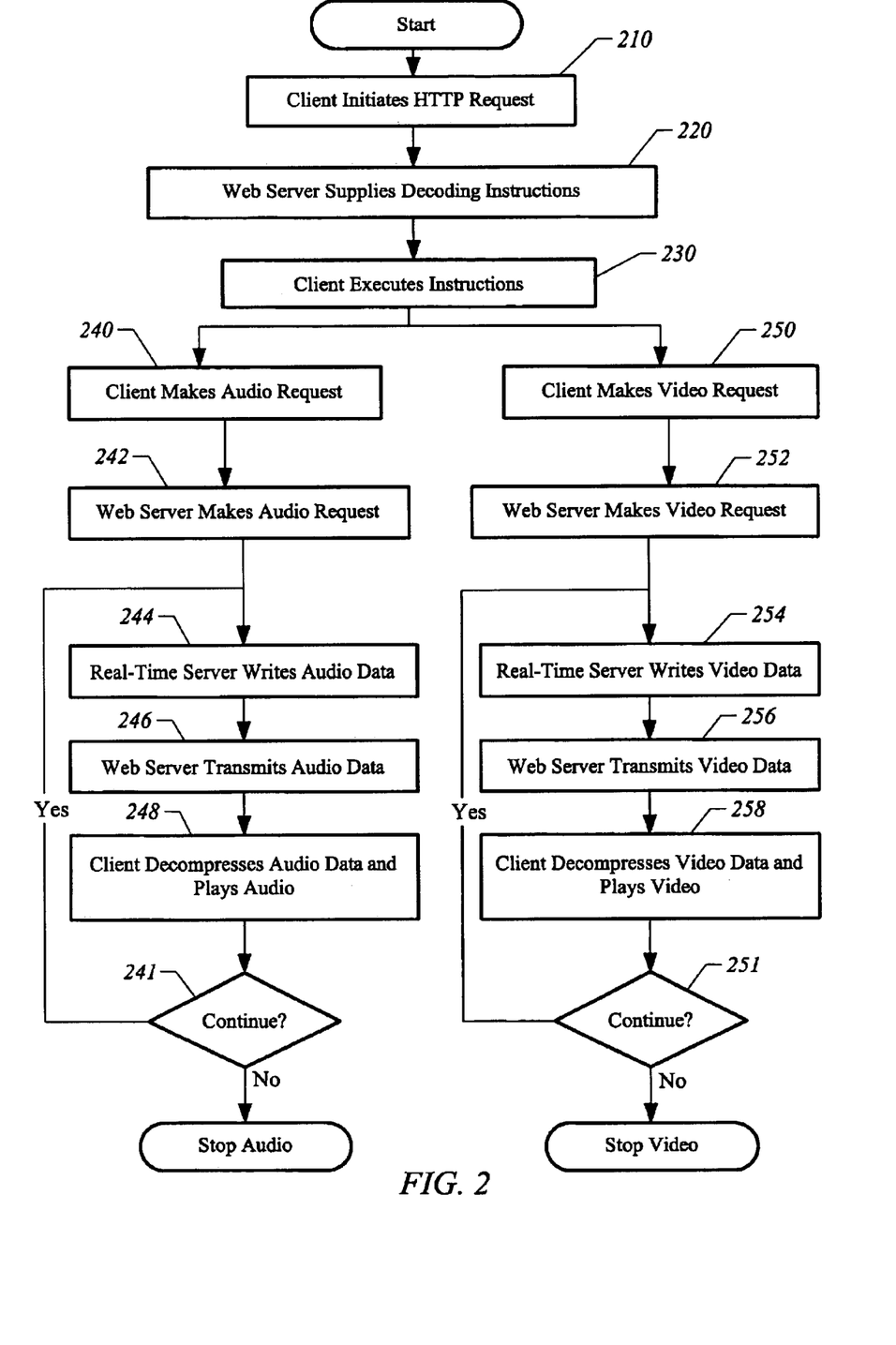
FIG. 2 illustrates an example method of streaming audio and video for multiple users.

FIG. 2 illustrates one example of a method of broadcasting streaming audio and video data to multiple users. This example method could be executed on the system of FIG. 1. In this example, the client 112 will initiate a request to receive streaming audio and video data 176 from the server side 130. The client 112 will display the video data in the video display area 103 and will play the audio data for the user. Importantly, the client 112 can play audio and video without the need of a plug-in or helper application. As will be shown, the audio and video play as part of a transparent process of the client 112 loading a web page from the server 131.

At block 210, the client 112 initiates an HTTP request from the web server 131. This could be the result of the browser 102 receiving and displaying an HTML (hypertext markup language) page including a link that will initiate streaming audio and video. The user would have selected this link which will then result in the browser 102 making the connection to the web server 131.

As a result of the connection, at block 220, the web server 131 supplies a Java applet for decoding audio data and that will help in the display of video information. These instructions could be supplied as two separate Java applets or one combined Java applet.

At block 230, the client executes the Java applets. The video display portion of the applet initiates a request of the web server 131 for a HTTP transmission of a multipart/mixed replace MIME encoded video (or in other embodiments, video data for Java decoding). Also at block 230, the audio Java applet makes a similar request of the web server 131. The requests can include optional information such as desired video frame rates or audio rates. The requests include the URI (universal resource indicator) indicating the particular audio or video streaming information to be served.

The following will describe the audio serving by the web server 131 and eventual decoding by the client 112. The video serving will be described after the audio.

At block 240, in response to executing the Java applet, the client makes an audio request of the web server 131. This is done through the Java applet which supplies a universal resource indicator to the web server 131. The universal resource indicator can indicate the audio stream that is being requested. This request looks, to the client 112, like a file download request. The web server 131 responds accordingly to this request by beginning to transfer the streaming audio information. Importantly, the client 112 does not need to know that the file is a streaming audio or video signal that is essentially never ending.

In response to the client request, the web server 131, and in particular the process 138, makes an audio data request of the shared memory 135. Note, if the process 138 had not been created, the web server 131 creates the process (in some embodiments, the web server 131 creates a separate process for each of the audio and video data streams). The audio data request of the shared memory is done by the web server 131, and in particular by the process 138, by notifying the real-time server 140 that audio information is requested. In subsequent iterations, the web server 131 need not make the explicit request for the audio information. Once requested, the real-time server 140 will continue to provide audio information, in these embodiments, until it is told to stop.

In any case, the real-time server 140, in response to the request, prepares audio information and writes this information into the shared memory 135. In various embodiments of the invention, the real-time server 140 prepares the audio data by breaking the audio information into time periods. This audio information is also compressed into various sets of compressed data corresponding to different audio rates. Higher audio rates correspond to better quality audio signals. In these embodiments of the invention, the real-time server 140 writes the data for the various audio rates to the shared memory 135, thereby reducing the work load of the web server 131. Different web server 131 processes will require different audio rates depending on their connections to their respective clients. By storing the information corresponding to the different audio rates into the shared memory 135, each process can access the desired audio rate data from the shared memory 135. Thus, the web server 131 need not calculate the compressed audio data for each process within the web server 131.

The process 138, through the web server 131, now transmits the data accessed from the shared memory 135. This corresponds to block 246.

At block 248, the client 112 receives the compressed audio data. The client decompresses the audio data as commanded by Java audio applet, and plays the audio information through the audio system of the client 112.

At block 241, a test is made to determine whether the web server 131 should continue broadcasting the streaming audio information to the client 112. This test is made by determining whether the client 112 has broken the connection to the web server 131.

The web server will continue serving the data as long as the client 112 is connected to the web server 131 through the Java audio applet.

Note, importantly, the user at the client 112 has not had to download any additional plug-ins or helper programs to play the streaming audio information.

Turning to the video broadcasting, at block 252, the web server 131 makes a video information request to the real-time server 140. The real-time server 140 takes each video frame from the video module 144, or the video proxy module 148, and compresses that information into a JPEG image. In some embodiments of the invention, the video card 159 provides the images as JPEGs. The requesting procedure is similar to that followed in the audio request block 240.

The real-time server 140, at block 254, writes one JPEG frame into the shared memory 135. The process 138 accesses the shared memory 135 to retrieve the JPEG frame and transmit that frame to the client 112. At block 256, the process also formats the JPEG as part of a multipart MIME encoded file.

At block 258, the client 112, using the capabilities of the browser 102, decompresses the video data from the MIME encoded format, and the JPEG encoded form, and creates the video display 103.

At block 251, the web server 131 determines whether the video Java applet is still requesting video frames. Block 254 through block 251 are then repeated. The result of these blocks is that multiple frames of video information is displayed in the video display 103. Thus, the user has the perception of a video display at the client 112.

Note, by the time the audio information is played from the previous audio transmission, a new audio transmission has been received and decompressed. Thus, the client 112 will have a continuous audio signal being presented to the user.

If it is the case that the audio, or the video, information is not being received by the client 112 at a sufficient data rate, the corresponding Java applet, in some embodiments of the invention, can request a different rate of transmission. The Java applet can request a lower rate corresponding to a lower audio or video signal, that will more appropriately match the bandwidth availability of the client 112.

One advantage of the system of FIG. 1 is that if the web server 131 becomes heavily loaded, the video frame rate is automatically reduced. This is done by ensuring that the audio processes take priority over the video processes. If a video process cannot access the shared memory 135 in sufficient time, that video frame will simply not be transmitted to the client 112. However, the corresponding audio process should have an opportunity to transmit the audio information.

As has been seen by the above discussion, the user has not been required to download any plug-ins or use any helper applications in the receiving of the streaming audio and video data. Additionally, the web server 131 is able to execute this example method for multiple clients. Each client would have a corresponding set of processes in the web server 131. The number of processes is only limited to the number of connections that can be supported by the web server 131. As has been noted, some of the work that would normally be performed by the web server 131 has been moved into the real-time server 140 to reduce the load on the web server 131.

(d) Example Video Display

Figure 3:
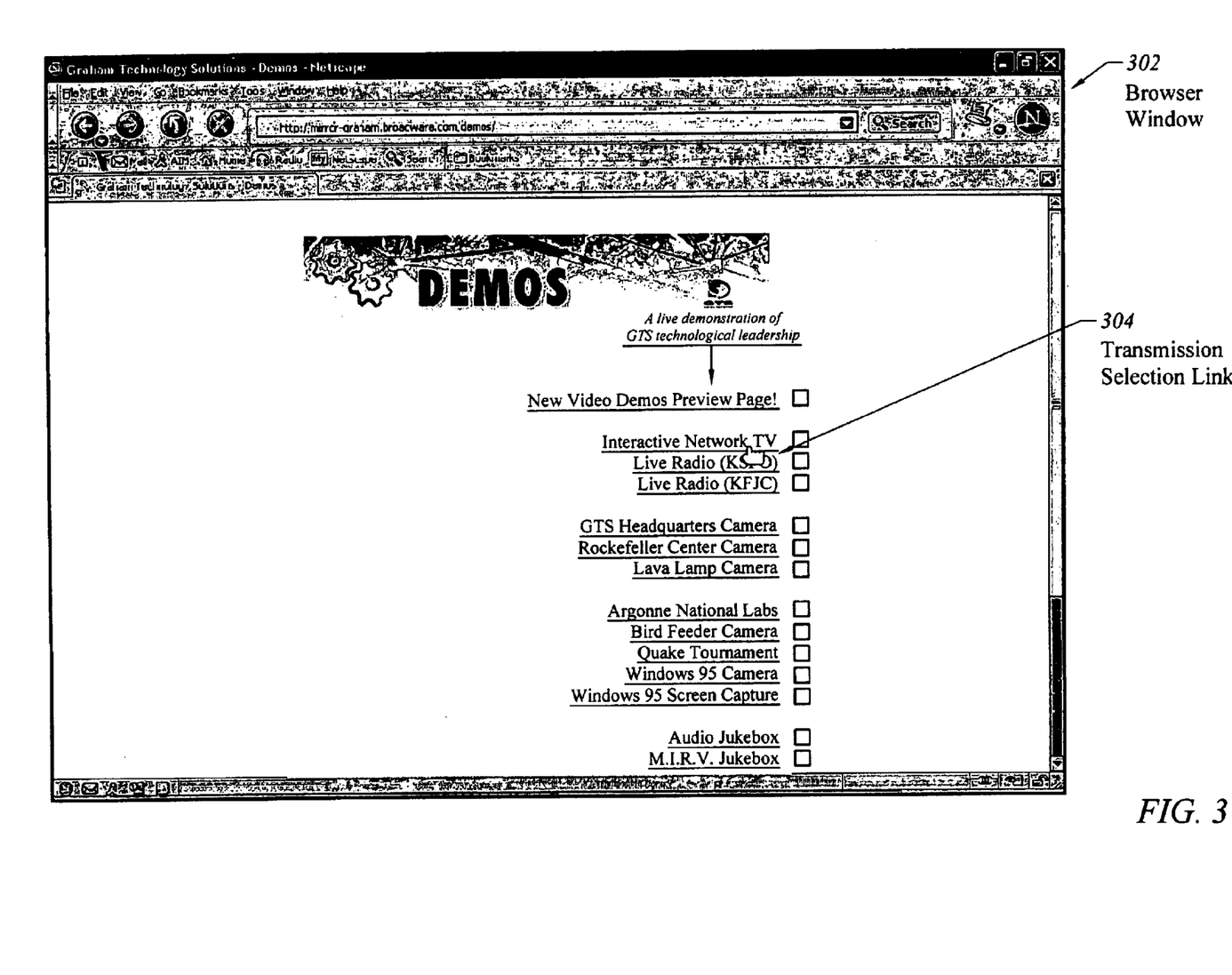
FIG. 3 illustrates a web page that a user can use to access a streaming audio and video broadcast.
Figure 4:
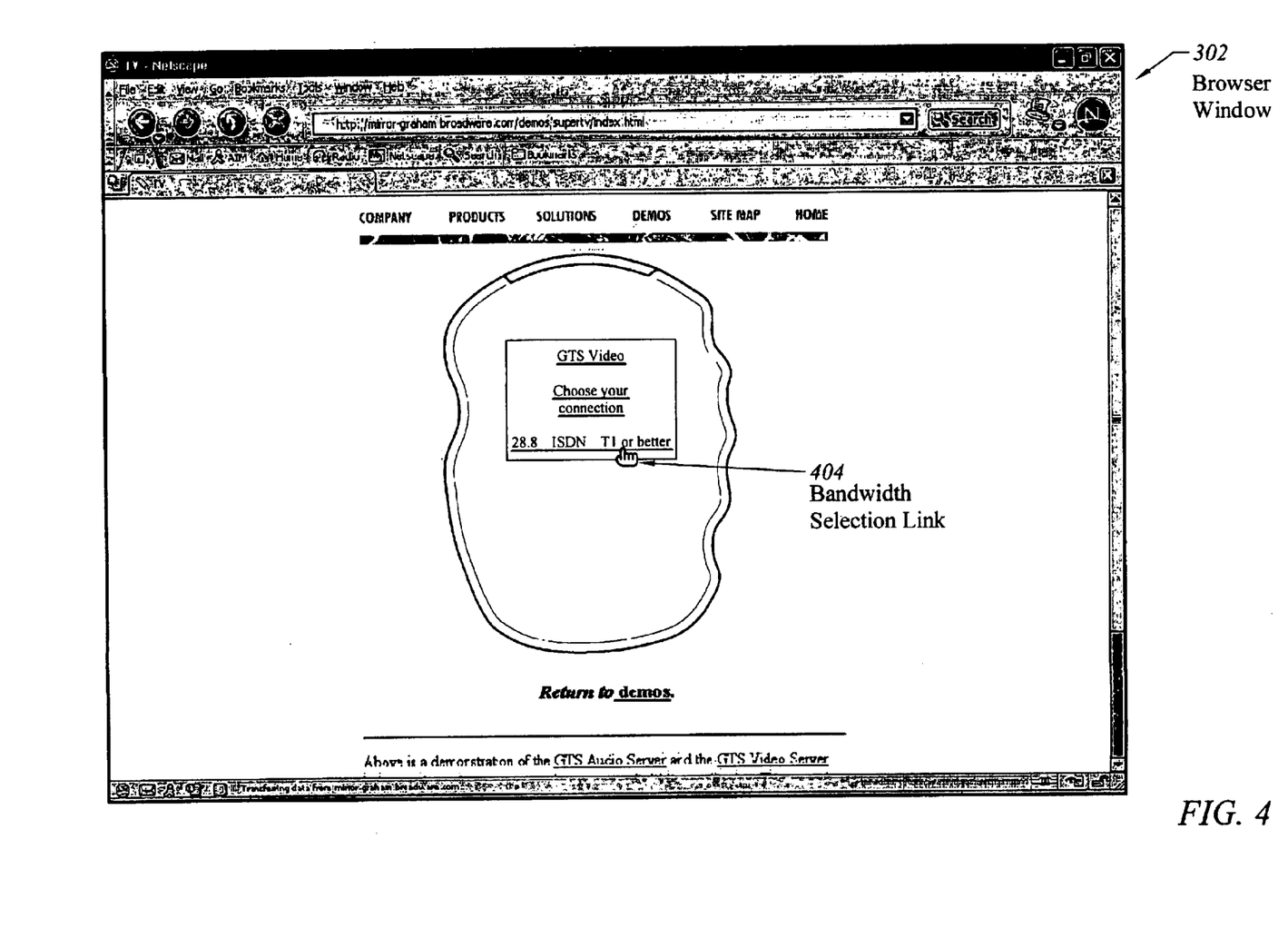
FIG. 4 illustrates a web page for selecting the bandwidth of the user's Internet connection.
Figure 5:
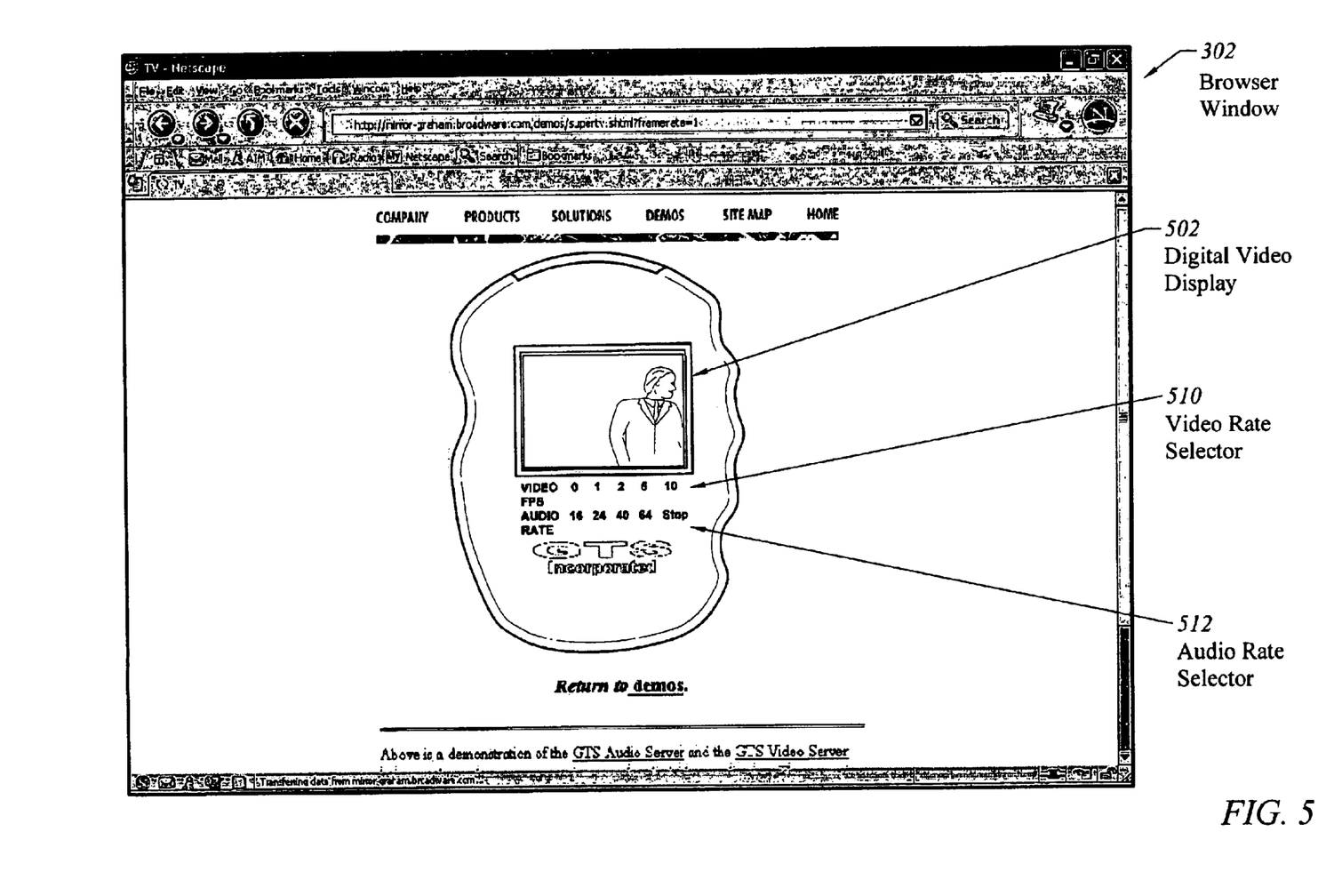
FIG. 5 illustrates a web page having streaming audio and video.

FIG. 3 through FIG. 5 represent the interface presented to a user using a browser 102 on a client 112. In this example, the user is using a standard PC with a standard Netscape Communicator™ 4.0 browser application. FIG. 3 includes a browser window 302 with a cursor positioned over a transmission selection link 304. The transmission selection link 304 corresponds to a request for transmission of streaming audio and video data. FIG. 4 illustrates the result of the selection of the transmission selection link 304. The user is presented with a number of connection speeds to select from. The user selects the speed associated with his or her connection speed to the Internet 185. In this example, the user is selecting a T1 or better connection speed. In one embodiment of the invention, the Java applets are controlling the presentation of the various selection speeds. This is shown as a bandwidth selection link 404.

FIG. 5 illustrates the result of the "T1 or higher" bandwidth selection link being chosen. A digital video display 502 is shown in the browser window 302. The client computer executing, the Netscape Communicator browser, is playing an audio signal corresponding to the digital video display 502. In this example, a user is allowed to modify the video rate, shown in frames per second, by selecting one of the video rate selectors 510. A result of selecting one of the various video rate selectors 510 would be that the corresponding video Java applet will communicate with its corresponding process in the web server 131. The Java applet would request a change in the video frame per second rate being supplied by the process in the web server 131. Similarly, a set of audio rate selectors 512 allow the user to select a higher or lower quality audio signal. The corresponding Java audio applet would communicate with its corresponding process in the web server 131 to request the change in the audio rate.

(e) Additional Embodiments

Thus a system for broadcasting streaming video and audio information to multiple users has been described. However, various embodiments of the invention include modifications and optional additions to the system.

It is possible for the real-time server 140 to be receiving and transmitting multiple different video and audio signals through the web server 131. Additionally, multiple web servers could be accessing the information from the real-time server 140. Additionally, multiple real-time servers 140 could be providing information for the web server 131.

In some embodiments of the invention, users can select either the audio stream, the video stream, or both the audio and video stream from a server. Similarly, some users can select one of these sets of streams while other users select other sets of streams. Additionally, some users can select different rates for audio or video information than other users. In such systems, the real-time server 140 supplies the data corresponding to the requested rates to the shared memory 135. For example, if one user is requesting a first audio rate and a second user is requesting a second audio rate, the shared memory 135 would store audio data for both audio rates of compression. In some embodiments, the web server 131 notifies the real-time server 140 when a particular audio rate is not required by any of the processes anymore.

(f) Proxy Switching

Figure 6:
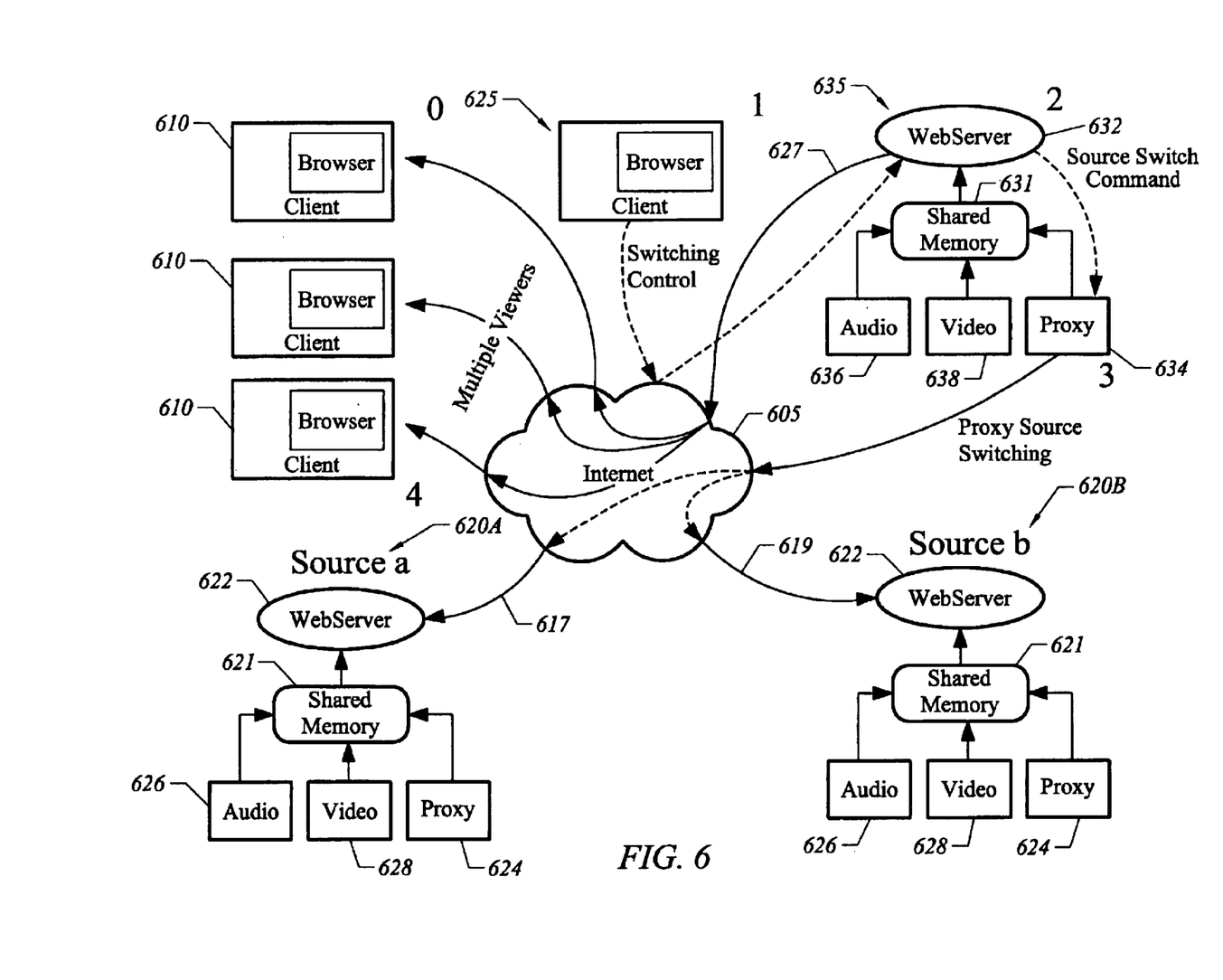
FIG. 6 is a block diagram under another embodiment of the invention, illustrating a proxy switching system

FIG. 6 illustrates a system 600 under another embodiment of the invention. The system 600 enables viewers on client terminals 610 to experience streaming media broadcast from multiple sources 620A on a network such as the Internet. With system 600, client terminals 610 may be switched seamlessly between media sources. Specifically, users of client terminals 610 can be switched between sources of streaming media without experiencing an interruption that would otherwise result from breaking a connection with one streaming media source 620A to receive streaming media from another source 620B.

In an embodiment, system 600 includes administrator 625 coupled to proxy switching source 635 across the Internet 605. The proxy switching source 635 communicates over the Internet 605 with other streaming media sources 620A and 620B.

The proxy switching source 635 includes a web server 632 to communicate with client terminals and other servers over the Internet. The proxy switching source 635 may also function as a streaming media source for client terminals 610. To this end, proxy switching source 635 may include an audio module 636 to receive and digitize audio input for broadcasting streaming audio media to client terminals 610. The proxy switching source 635 may also include a video module 638 to receive and digitize video input for broadcasting streaming video media to the client terminals 610. The proxy switching source 635 also includes proxy switching module 634. The proxy switching module 634 communicates with other servers to receive streaming audio and/or video media. In particular, the proxy switching module 634 communicates with web servers 622 of the streaming media sources 620A and 620B to receive streaming media via the Internet 605. For proxy switching source 635, shared memory 631 stores streaming media received from video module 638, audio module 636, or through media source 620A and 620B via proxy switching module 634. The web server 632 of proxy switching source 635 transmits streaming media that is first stored in shared memory 631.

The streaming media sources 620A and 620B each include web server 622. Each streaming media source 620A, 620B is assumed to include a video module 628, an audio module 626, and a proxy switching module 624. As with proxy switching source 635, the audio module 626 receives and digitizes audio input. The video module 628 receives and digitizes video input.

The proxy switching module 624 enables sources 620A, 620B to each receive streaming audio and video media from other sources (not shown). A shared memory 621 stores streaming media data for web server 622. In this way, an embodiment may provide for each source 620A, 620B to alternatively function as proxy switching source 635.

In an embodiment, administrator 625 is a client terminal having browser 628. The administrator 625 may also include a display area to view streaming media from the selected source 620. In an embodiment, administrator 625 includes an editor interface to select one of the streaming media sources 620A, 620B for broadcast to client terminals 610. For example, the editor interface may display streaming audio and video media from each source 620A and 620B. The editor interface may also include a selection feature, such as a point-and-click mechanism or selection icon, to enable the editor of administrator 625 to select one of the streaming media sources 620A, 620B for broadcast to client terminals 610.

Initially, the administrator 625 selects, for example, media source 620A. The selection is passed to proxy switching source 635. The proxy switching source 635 establishes communications with the selected media source 620A. When media source 620A is selected by administrator 625, the proxy switching source 635 couples to a channel 617 for receiving streaming media from media source 620A. The shared memory 631 stores the streaming media from source 620A. The streaming media stored in shared memory 631 is subsequently signaled by web server 632 to client terminals 610 (and administrator 625). The web server 632 signals the streaming media from the media source 620A to the client terminals 610 on a communication channel 627 available through the Internet 605.

The administrator 625 may subsequently select source 620B. A switching control signal is transmitted to web server 632 via Internet 605 to signal the switch. The switch control causes proxy switching module switches to channel 619 to receive streaming media from source 620B. The shared memory 631 then receives streaming media from source 620B. The web server module 632 accesses the streaming media from shared memory 631. The web server 632 then signals the streaming media from source 620B to client terminals 610 on the communication channel 627, once streaming media from source 620A that remaining in shared memory 631 is transmitted to client terminals 610. The web server 632 does not disconnect or break the connection of communication channel 627 while proxy server module 634 makes the switch from source 620A to 620B. The web server 632 seamlessly transmits the streaming media from source 620B. The client terminals 610 maintain their connections with web server 632, and the web server 632 is not interrupted in signaling streaming media after switching to source 620B. Thus, once administrator 625 switches from source 620A to source 620B, clients 610 are all seamlessly switched together from source 620A to source 620B. The communication channel 627 between client terminals 610 and web server 632 remains intact. The effect is that all of the client terminals 610 switch streaming media sources 620A and 620B nearly simultaneously, without an interruption or break in experiencing streaming media.

While system 600 illustrates administrator 625 as signaling a switch to occur from source 620A to source 620B, other embodiments may provide that one or more of the client terminals 610 can signal the switch to proxy switching source 635. In these embodiments, web server module 632 of proxy switching source 635 receives the switch request from one of the clients 610. That client terminal 610 making the switch request may be treated as an administrator, in which case all of the other clients are switched to the requested source together. Alternatively, the client terminal 610 making the switch request may be switched to a new source individually. As still another alternative, one or more of the client terminals 610 may make the request to switch media sources to administrator 625. The administrator 625 then chooses the response to the request.

In an embodiment shown by FIG. 6, the streaming media sources 620A and 620B are provided to alternatively function as proxy sources for other streaming media sources. Thus, in the example shown, each source 620A, 620B may route streaming media from one or more other sources. Further, each of the steaming media sources 620A, 620B may act as proxy switching sources, so as to switch between other sources (not shown) feeding media to the proxy modules 624 of the respective sources 620A, 620B. The administrator 625 may access the web servers 622 of the sources 620A and 620B to cause streaming media received from one source (not shown) by respective proxy modules 624 to be switch to another source (not shown). One of the advantages provided by this embodiment is that system 600 is scalable, allowing both proxy streaming media delivery and switching on a large scale.

Figure 7:
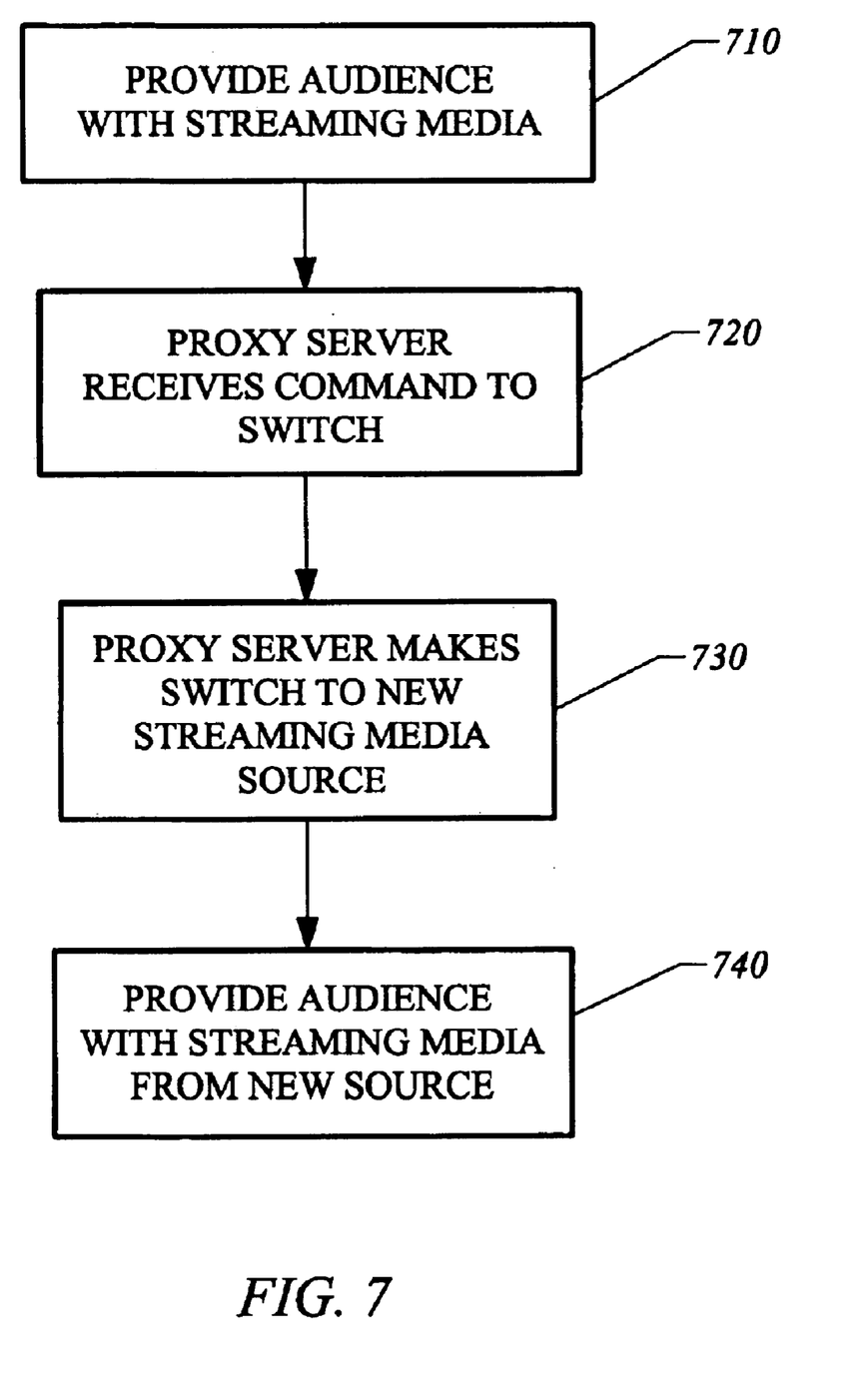
FIG. 7 is a flow chart for a process to use proxy switching for providing streaming media to client terminals, under an embodiment of the invention.

FIG. 7 illustrates a flow process for operating proxy switching, using a system such as shown by FIG. 6. In step 710, an audience is provided streaming media from a first source. The audience may comprise client terminals 610. The streaming media may include audio media and/or video media. The streaming media may originate from proxy switching source 635, or from one of the other sources 620A and 620B.

In step 720, a command is provided to proxy switching source 635 to switch sources from, for example, source 620A to source 620B. The command may alternatively request to switch from proxy switching source 635 to either source 620A or source 620B. The command may be provided from either administrator 625, or from one of the client terminals 610. The command is received by the server 632 of the proxy switching source 635.

The web server 632 of the proxy switching source 635 communicates the command to switch media sources to the proxy module 634. The command may be in the form of a uniform resource locator (URL), which instructs the web server 632 to cause the proxy module 634 to switch to the new media source 620B. The URL signaled as the command may include parameters to specify the switch. One format for a URL having parameters to cause the switch to a new media resource is as follows:

www.<hostingserver>.com/<file type>? server =<viewing channe number>% source=<sourcelocation>: <portnumber>-<channel number>

In the URL illustration, the new media source is provided as a new channel to clients 610.

In step 730, the proxy module switches to a different streaming media source. For example, the proxy module switches to receive streaming media from source 620B, rather than 620A.

In step 740, one or more of the participants in the audience experience streaming media from the new source. If, for example, administrator 625 makes the request, then all of the audience experiences streaming media from the new source. Alternatively, one of the participants may make an individual command, in which case only that client terminal 610 is coupled to receive streaming media from the new source 620B.

As an alternative mentioned with FIG. 6, proxy switching source 635 may be switched to one of the sources 620A or 620B. A command to cause a new host for streaming media delivery may be provided as a URL with parameters such as:

www.<hostingserver>.com/<file type>? server =<viewing channel number>% source=www.<newhost>.com: <portnumber>-<channelnumber>

(g) Examples of Proxy Switching

As one example, system 600 may provide a virtual seminar or symposium for an audience of users operating individual client terminals 610. The speakers of the seminar may be recorded in real-time through audio and video digitizers located on terminals or servers, forming streaming media sources 620A and 620B. For this example, it is assumed that system 600 is operated over the Internet. Since each speaker may be located in a different location, the media stream resulting from a broadcast by each speaker may be directed to proxy switching source 635. When a presentation by one speaker is completed, an administrator 625 can switch the audience to a new speaker. The switch may be made seamlessly from the audience's point of view, even though each client terminal comprising the audience is located remote from the rest of the audience. The administrator 625 may also use the seamless switching to enable a discussion to occur between speakers. For example, a speaker can indicate to administrator 625 a desire to respond to a statement by another speaker. The administrator 625 may then cause the switch to occur, so that the new speaker can address the audience, before switching back to the old speaker. The administrator 625 can make the switch without breaking the connection (communication channel 627) with the audience. As a result, the audience does not experience a broadcast interruption when a switch is made to a new speaker. In this manner, the virtual seminar can be made to simulate a real seminar, or a closed network analog broadcast of a seminar. However, system 600 enables the Internet to be used in a manner that enables the audience and speakers to be located remote from one another.

As another example, a classroom may use system 600 as an educational tool. The client terminals may be operated by students. The administrator 625 may be a teacher, providing the students with an educational streaming media content. The system 600 allows the teacher to use client terminals 610 to show each student the same streaming media content. The teacher may then switch the whole classroom to a new streaming media source, rather than require the students to make the switch independently.

(h) Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A system for providing streaming media to a plurality of clients over a network, the system comprising:
   a plurality of streaming media sources coupled to the network;
   a network server module that couples to the plurality of clients to signal streaming media from at least a first streaming media source in the plurality of streaming media sources to each of the plurality of clients using a first channel;
   a switching terminal to signal a switch request to the network server module, the switch request requesting streaming media from a second streaming media source in the plurality of streaming media sources; and
   a proxy module that forwards streaming media from the first streaming media source to the network server module, the proxy module being communicatable with the network server module to be signaled the switch request, and in response to the switch request, the proxy module forwarding streaming media from the second streaming media source to the network server module to facilitate seamless transition on the first channel from the first streaming media source to the second streaming media source.

2. The system of claim 1, wherein the proxy module forwards the streaming media from the second streaming media source to the network server module while the network server module signals streaming media from the first streaming media source to the plurality of client terminals.

3. The system of claim 1, further comprising a memory that stores streaming media forwarded from the proxy module for the network server module, the network server module accessing the memory to receive the streaming media forwarded from the proxy module.

4. The system of claim 3, wherein the proxy module forwards the streaming media from the second streaming media source to the network server module while the network server module is accessing the streaming media from the first streaming media source from the memory.

5. The system of claim 1, wherein the plurality of streaming media sources coupled to the network each include a proxy module to receive streaming media from other streaming media sources to facilitate large scale proxy streaming media delivery.

6. The system of claim 1, wherein the switching terminal is an administrator for the plurality of client terminals.

7. The system of claim 1, wherein the switching terminal is one of the plurality of client terminals that receives streaming media from the network server module.

* * * * *